United States Patent
Cassez et al.

(10) Patent No.: US 9,760,469 B2
(45) Date of Patent: Sep. 12, 2017

(54) ANALYSIS OF PROGRAM CODE

(71) Applicant: Synopsys, Inc., Mountain View, CA (US)

(72) Inventors: Franck Cassez, Eveleigh (AU); Christian Müller, Eveleigh (AU)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/540,929

(22) Filed: Nov. 13, 2014

(65) Prior Publication Data
US 2015/0220419 A1    Aug. 6, 2015

(30) Foreign Application Priority Data

Feb. 6, 2014 (AU) .............................. 2014900361
Aug. 6, 2014 (AU) .............................. 2014903052

(51) Int. Cl.
G06F 9/44 (2006.01)
G06F 11/36 (2006.01)
G06F 11/07 (2006.01)

(52) U.S. Cl.
CPC ...... *G06F 11/3604* (2013.01); *G06F 11/0718* (2013.01); *G06F 11/0751* (2013.01)

(58) Field of Classification Search
CPC ............. G06F 11/3604; G06F 11/0718; G06F 11/0751
USPC ......... 717/124, 127–128, 131–133, 141–144
See application file for complete search history.

(56) References Cited

U.S. PATENT DOCUMENTS

| 6,874,134 | B1 | 3/2005 | Collin et al. |
| 7,287,235 | B1 | 10/2007 | Hasteer |
| 7,398,424 | B2 | 7/2008 | Higuchi |
| 7,599,981 | B2 | 10/2009 | Ekner |
| 8,458,679 | B2 | 6/2013 | Archambault |
| 8,527,976 | B2* | 9/2013 | Kahlon et al. ............... 717/126 |

(Continued)

OTHER PUBLICATIONS

Albarghouthi et al., "Whale: An Interpolation-Based Algorithm for Inter-procedural Verification", 2012, VMCAI'12 Proceedings of the 13th international conference on Verification, Model Checking, and Abstract Interpretation, pp. 39-55.*

(Continued)

*Primary Examiner* — Ted T Vo
(74) *Attorney, Agent, or Firm* — HIPLegal LLP; Judith A. Szepesi

(57) ABSTRACT

This disclosure relates to the analysis of a program based on source code where the source code comprises a call to a function associated with a function implementation. A processor determines, based on a summary that over-approximates the function, an assignment of an input variable and an output variable of the function call to reach a predefined state. The processor then determines, based on the implementation of the function whether the assignment of the input variable results in the assignment of the output variable. If it does not, the processor determines a narrowed summary for the function such that the narrowed summary over-approximates the function and excludes the assignment of the input variable and the output variable. Finally, the processor stores the narrowed summary on a datastore. Inlining of function code and unfolding of loops is avoided and parallel processing of multiple functions is possible.

19 Claims, 10 Drawing Sheets

(56) References Cited

U.S. PATENT DOCUMENTS

| | | | |
|---|---|---|---|
| 8,615,748 | B2 | 12/2013 | Doyle |
| 2003/0005393 | A1 | 1/2003 | Kawamoto |
| 2004/0243339 | A1 | 12/2004 | Maruyama |
| 2006/0150160 | A1* | 7/2006 | Taft et al. ............ 717/126 |
| 2006/0248518 | A1 | 11/2006 | Kundert |
| 2007/0169039 | A1 | 7/2007 | Lin |
| 2010/0313175 | A1 | 12/2010 | Petlin |
| 2011/0289485 | A1 | 11/2011 | Mejdrich |
| 2013/0125097 | A1 | 5/2013 | Ebcioglu |
| 2013/0290693 | A1 | 10/2013 | Guerrero |

OTHER PUBLICATIONS

Heizmann et al, "Refinement of trace abstraction", Static Analysis Symposium, 2009, pp. 69-85.

Aws Albarghouthi et al., "Whale: An Interpolation-based Algorithm for Interprocedural Verification", VMCAI 2012, Jan. 24, 2012, 26 pages.

Sery et al., "Interpolation-based Function Summaries in Bounded Model Checking", University of Lugano, Formal Verification and Security Lab, Switzerland, 15 pages. , 2009.

Heizmann et al., "Nested Interpolants" University of Freiburg, Germany, POPL'10, Jan. 17-23, 2010, 12 pages.

Heizmann et al., "Software Model Checking for People Who Love Automata", University of Freiburg, Germany, CAV 2013, LNCS 8044, pp. 36-52, 2013.

Christain Muller, "Modular Interprocedural Verification using Interpolant Function Summaries", Software Engineering Elite Graduate Program, NICTA, Nov. 19, 2013, 68 pages.

Nishant Sinha, "Modular Bug Detection with Inertial Refinement", NEC Research Labs, Princeton, USA 2010, pp. 199-206.

Christ et al., "SMT Interpol: an Interpolating SMT Solver", Model Checking Software, LNCS 7385, 2012, pp. 248-254.

* cited by examiner

300

```
1 proc main () : (n) {
2   assume (m >= 1);
3   n = inc (1, m);            304
4   assert (n >= 0);           314
5 }
6
7 proc inc (p,q) : (r) {        308 310 312
8   assert (p >= 0);
9   if (p >= 1)
10    r = q + 1;
11  else
12    r = q;
13  endif ;
14 }
```
302 … 306

| function | precondition | postcondition |
|---|---|---|
| inc | True | True |

| function | precondition | postcondition |
|---|---|---|
| inc | p=5, q=8 | r!=-1 |

| function | precondition | postcondition |
|---|---|---|
| inc | $p \geq 1 \wedge q \geq 1$ | $r \geq q + 1$ |

Fig. 4c $A_{main}$ (entry is 1, exit is 5)

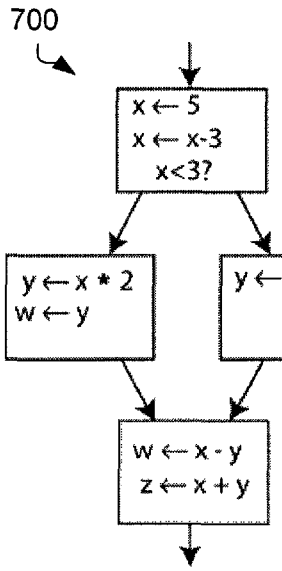
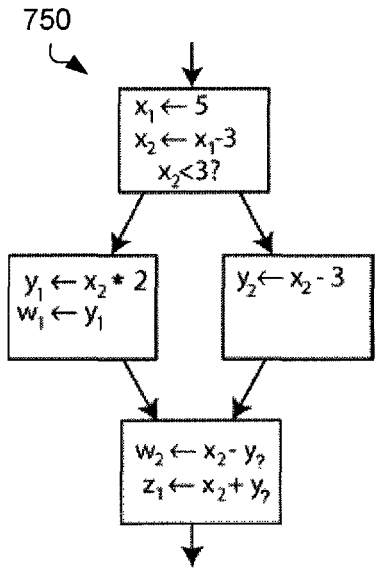

Algorithm 1: $Hoare_1(A_f, P, Q)$

Input : A function automaton $A_f$, two predicates $P$ and $Q$.
Result: $itp(P', Q')$ with $P \Rightarrow P'$ and $Q' \Rightarrow Q$ if $\{P\}\ A_f\ \{Q\}$ holds,
           $path(t)$ with $post(P, t) \cap \neg Q \not\subseteq False$ otherwise.
Var   : $\overline{A}$: arrays of interpolant automata, initially empty
           $\overline{P}, \overline{Q}$: arrays of predicates, initially empty
           $n$ : integer, initially 0

1  while $\mathcal{L}(A_f) \not\subseteq \cup_{i=1}^{n} \mathcal{L}(A_i)$ do
     /* There is a trace $t$ from *entry* to *exit* in $A_f \setminus \cup_{i=1}^{n}\mathcal{L}(A_i)$ */
2     Let $t = st_1 \cdots st_k \in \mathcal{L}(A_f) \setminus \cup_{i=1}^{n}\mathcal{L}(A_i)$;
3     if $post(t, P) \cap \neg Q \not\subseteq False$ then
         /* $post(t, P) \subseteq Q$ does not hold, $t$ is a counter-example */
4         return $path(t)$;
5     else
         /* $t$ is $(P, \neg Q)$-infeasible, we refine and iterate */
6         Let $\mathcal{I} = I_0, \cdots, I_k \in itp_{P, \neg Q}(t)$;
7         Let $n := n + 1$;
8         Let $A_n = A(P, \neg Q)_\mathcal{I}^t$;
9         let $P_n := I_0$ and $Q_n := I_k$;

10 return $itp(\cap_{i=1}^{n} P_i, \cup_{i=1}^{n} Q_i)$;

| Algorithm 2: $Hoare_2(A_f, P, Q)$ |
|---|
| Global: $\mathcal{C}$: context with summaries for each function, initially $(True, True)$ |
| Input : A function automaton $A_f$, two predicates $P$ and $Q$. |
| Result: If $\{P\}\ A_f\ \{Q\}$ holds, $itp(P', Q')$ with $P \implies P'$ and $Q' \implies Q$ |
|         Otherwise an inter-procedural path $path(t)$ with $post(P,t) \cap \neg Q \not\subseteq False$. |
| Local : $\overline{A}$: arrays of interpolant automata, initially empty |
|       $\overline{P}, \overline{Q}$: arrays of predicates, initially empty |
|       $n$: integer, initially 0 |

```
   /* Main refinement loop */
 1 while L(A_f) ⊄ ∪ⁿᵢ₌₁ L(Aᵢ) do
       /* There is a trace from entry to exit in L(A_f) \ ∪ⁿᵢ₌₁ L(Aᵢ) */
 2     Let t = st₁ ··· st_k ∈ L(A_f) \ ∪ⁿᵢ₌₁ L(Aᵢ);
       /* Determine the status of t (and update summaries C) */
 3     (R, path(t) := Status(t, P, ¬Q);  ⟵802
       /* Status of t is settled */
 4     if R then
            /* {P} A_f {Q} is not valid and path(t) a counter-example */
 5          return path(t);
 6     else
            /* t is (P, ¬Q)-infeasible, we refine and iterate */
 7          Let I = I₀, ··· , I_k ∈ itp_{P,¬Q}(t);
 8          n := n + 1;
 9          A_n := A(P, ¬Q)ᵗ_I;
10          P_n := I₀ and Q_n := I_k;
   /* {P} A_f {Q} is valid. Add to C and returns a stronger summary */
11 C(f) := C(f) ∪ {(∩ⁿᵢ₌₁ Pᵢ, ∪ⁿᵢ₌₁ Qᵢ)};
12 return itp(∩ⁿᵢ₌₁ Pᵢ, ∪ⁿᵢ₌₁ Qᵢ);
```

| Algorithm 3: $Status(t, P, Q)$ |
|---|

Global: $\mathcal{C}$: context with summaries for each function, initially $(True, True)$ Input : A trace $t$, two predicates $P$ and $Q$
Result: $(False, \bot)$ if $t$ is $\mathcal{C}$-$(P,Q)$-infeasible and thus $(P,Q)$-infeasible
$(True, \text{path}(t))$ with $\text{path}(t)$ a $(P,Q)$-feasible full inter-procedural path.

1    Let $t = st_1 st_2 \cdots st_k$;
2    Let $\mathsf{FCall} = \{1 \leq i \leq k \mid st_i \text{ is a function call}\}$;
      /* Initialise path($t$) for regular statements */
3    foreach $i \in \{1, \cdots, k\} \setminus \mathsf{FCall}$ do $\text{path}(st_i) := st_i$;
4    while $True$ do
5        if $\widehat{\text{post}}(\mathcal{C}, t, P) \cap Q \not\subseteq False$ then
          /* $t$ is $(P,Q)$-feasible under $\mathcal{C}$ */
6           Let $\{(\nu_i, \mu_i), i \in \mathsf{FCall}\}$ be the set of witness before/after values;
          /* Check whether each function call step is feasible */
7           foreach $i \in \mathsf{FCall}$ do $\text{path}(st_i) = \bot$;
8           foreach $i \in \mathsf{FCall}(t)$ do
9              Let $st_i$ be a call to f with f defined by $\mathtt{f}(\overline{x}):\overline{y}$ ;
10            switch $Hoare_2(\overline{x} = \nu_i, A_f, \neg(\overline{y} = \mu_i))$ do
11                case $\text{path}(u)$
                  /* $u$ s.t. $\text{post}(u, \overline{x} = \nu_i) = \overline{y} = \mu_i$ */
12                  $\text{path}(st_i) := \text{path}(u)$;
13                case $\text{itp}(P', Q')$
                  /* f satisfies $\{\overline{x} = \nu_i\}$ $A_q$ $\{\neg(\overline{y} = \mu_i)\}$ */
                  /* $(P', Q')$ has been added to summary of f */
14           if $\bigwedge_{l \in \mathsf{FCall}} \text{path}(st_l) \neq \bot$ then
15              return $(True, \text{path}(t))$
16        else
          /* $t$ is $(P,Q)$-infeasible under $\mathcal{C}$ and thus $(P,Q)$-infeasible */
17           return $(False, \bot)$;

Fig. 10a

ANALYSIS OF PROGRAM CODE

CROSS-REFERENCE TO RELATED APPLICATIONS

The present application claims priority from Australian provisional application no 2014900361 filed on 6 Feb. 2014 and Australian provisional application no 2014903052 filed on 6 Aug. 2014 the content of which is incorporated herein by reference.

TECHNICAL FIELD

This disclosure relates to the analysis of a program based on source code where the source code comprises a call to a function associated with a function implementation.

BACKGROUND ART

One approach to analysing program code is to inline function calls, which means that the implementation of a function is copied into the program every time that function is called. This results in a code size that is exponential in the number of nested function calls.

Many industrial-strength source code analysers face similar challenges: 1) it is generally difficult to build a complete monolithic representation of the software as it is often too large to fit into memory; 2) source code of some pieces of the software may not be available, such as library functions; 3) noise created by false positives may render the analysis unusable and 4) providing developers with feasible inter-procedural counter-examples is still an issue.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

DISCLOSURE OF INVENTION

There is provided a computer implemented method for analysing a program based on source code. The source code comprises a call to a function associated with a function implementation. The method comprises:
  determining, based on a summary that over-approximates the function, an assignment of an input variable and an output variable of the call to the function such that the assignment allows the program to reach a predefined state;
  determining, based on the implementation of the function whether the assignment of the input variable results in the assignment of the output variable;
  upon determining that the assignment of the input variable does not result in the assignment of the output variable, determining a narrowed summary for the function such that the narrowed summary over-approximates the function and excludes the assignment of the input variable and the output variable; and
  storing the narrowed summary associated with the function on a datastore.

Instead of inlining functions, the method uses a summary for each function. Since that summary is generally not known at the beginning of the analysis, a processor may assume the most pessimistic summary possible. Methods, such as SMT or SAT solvers are then applied to find an error condition using these pessimistic summaries. Since the summaries are pessimistic, an error condition will be found in most cases. The method then uses the calculated error condition to refine the summaries of the functions. This process may be repeated to obtain refined summaries of the functions. These refined summaries can be re-used when the same function is called again at a different location of the code.

The advantages are that inlining of function code and unfolding of loops is avoided and parallel processing of multiple functions is possible.

Determining the narrowed summary may comprise:
  generalising the assignment of the input and output variables based on the assignment of the input and output variables; and
  determining the narrowed summary such that the narrowed summary excludes the generalised assignment of the input and output variables.

Generalising the assignment of the input and output variables may be based on a rejecting automaton.

The method may further comprise determining a sequence of instructions such that the sequence of instructions allows the program to reach the predefined state, wherein determining the assignment of input and output variables comprises determining the assignment of input and output variables such that the assignment realises the sequence of instructions.

Determining whether the assignment of the input variables results in the assignment of the output variables may comprise performing a second iteration of the method, wherein the source code in the second iteration is the source code of the called function.

The method may further comprise upon determining that the assignment of the input variables does result in the assignment of the output variables, storing an indication on the datastore that there is an error in the program.

The source code may comprise a first call to the function and a second call to the same function, wherein determining the assignment of input and output variables of the second call to the function is based on the narrowed summary determined in relation to the first call to the function.

The method may further comprise receiving the summary from the datastore.

The source code may comprise multiple calls to multiple functions and the method may comprise repeating the method for each of the multiple calls.

Repeating the method may comprise performing the method for two or more of the multiple functions concurrently.

Performing the method concurrently may comprise performing the method concurrently on two or more processor cores.

The source code may comprise multiple files and the method may comprise performing the method once for each of the multiple files and then repeating the method.

The method may further comprise repeating the method for multiple repetitions using the narrowed summary of a first repetition as the summary for a subsequent repetition to iteratively further narrow the summary.

The method may further comprise
  determining whether a termination criterion is met; and
  upon determining that the termination criterion is met, terminating the repeating of the method and storing on the datastore an indication that no error has been found.

The predefined state may be an error state and the function implementation may be a behavioural specification.

The method may further comprise generating a graphical indication of the predefined state in the source code.

Software, when installed on a computer, causes the computer to perform the above method.

A computer system for analysing a program based on source code comprises:
- a datastore to store the source code comprising a call to a function associated with a function implementation; and
- a processor
  - to determine, based on a summary that over-approximates the function, an assignment of an input variable and an output variable of the call to the function such that the assignment allows the program to reach a predefined state,
  - to determine, based on the implementation of the function whether the assignment of the input variable results in the assignment of the output variable,
  - upon determining that the assignment of the input variable does not result in the assignment of the output variable, to determine a narrowed summary for the function such that the narrowed summary over-approximates the function and excludes the assignment of the input variable and the output variable, and
  - to store the narrowed summary associated with the function on the datastore.

Optional features described of any aspect of method, computer readable medium or computer system, where appropriate, similarly apply to the other aspects also described here.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

An example will be described with reference to

FIG. 3 illustrates an example program represented by source code.

FIG. 4a illustrates a summary for function "inc" at the beginning of the first iteration of the method of FIG. 2.

FIG. 4b illustrates a narrowed summary.

FIG. 4c illustrates a further narrowed summary.

FIG. 7a illustrates a further example original CFG.

FIG. 7b illustrates a modified CFG after introducing SSAs.

FIG. 8 illustrates a first algorithm for determining a stronger Hoare triple.

FIG. 9a illustrates a second algorithm for inter-procedural modular trace refinement.

FIG. 9b is a flowchart of the second algorithm in FIG. 9a.

FIG. 10a illustrates a third algorithm for checking feasibility of a trace.

FIG. 10b is a flowchart of the third algorithm in FIG. 10a.

BEST MODE FOR CARRYING OUT THE INVENTION

This disclosure addresses the problem of designing a context-sensitive, scalable inter-procedural analysis framework. The disclosed methods are modular, and analyse each function without in-lining function calls but rather by using the available summaries. This provides scalability. Context-sensitivity is achieved by building summaries in a top-down manner and being able to refine the summaries (on-demand) during the analysis. This removes a large number of false positives. Moreover, when a requirement violation is detected, it builds an inter-procedural counter-example that helps the developer understand the cause of the problem.

Figure 1:
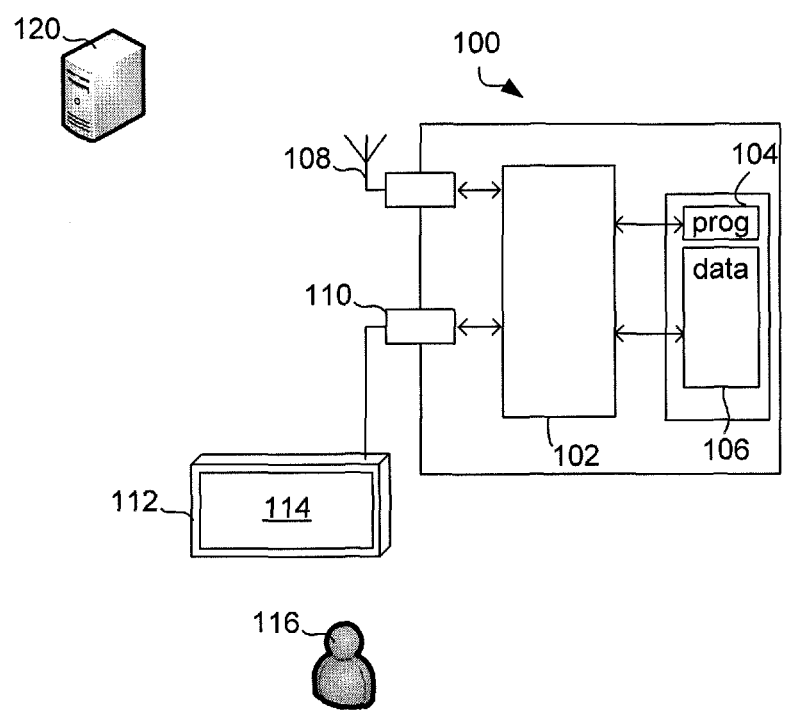
FIG. 1 illustrates a computer system 100 for analysing a program based on source code.

FIG. 1 illustrates a computer system 100 for analysing a program based on source code, such as C++ code, that is stored as ASCII characters on one or more physical files on a data store, such as a hard disk drive. Typically, source code is spread over a large number of files, such as 100 files, and comprises calls to multiple functions, which are associated with function implementations, such as C++ function definitions or high level, behavioural models. The function implementations are also part of the source code and are also stored in the files on the hard disk drive.

The computer system 100 comprises a processor 102 connected to a program memory 104, a data memory 106, a communication port 108 and a user port 110. The program memory 104 is a non-transitory computer readable medium, such as a hard drive, a solid state disk or CD-ROM. Software, that is an executable program, stored on program memory 104 causes the processor 102 to perform the method in FIG. 2, that is, the processor 102 determines an assignment of input and output variables of a call to a function, determines whether the assignment of the input variables results in the assignment of the output variables and if not, determines a narrowed summary. The narrowed summary is a piece of physical electronic data that abstracts the behaviour of the respective function. For example, each summary may be stored as ASCII characters as a separate file or all summaries can be stored as database entries in a single SQL database.

The processor 102 may receive data, such as summaries or source code, from data memory 106 as well as from the communications port 108 and the user port 110, which is connected to a screen 112 that shows a visual representation 114 of the summaries and the program code and a report of the code analysis to a programmer 116. Screen 112 may also show a tree or graph structure for each function and parts or all of the source code.

In one example, the processor 102 sends a request for summaries or source code to a server 120 and receives summaries or source code from server 120 via communications port 108, such as by using a Wi-Fi network according to IEEE 802.11, 3G, the Internet or any combination thereof. The Wi-Fi network may be a decentralised ad-hoc network, such that no dedicated management infrastructure, such as a router, is required or a centralised network with a router or access point managing the network.

Although communications port 108 and user port 110 are shown as distinct entities, it is to be understood that any kind of data port may be used to receive data, such as a network connection, a memory interface, a pin of the chip package of processor 102, or logical ports, such as IP sockets or parameters of functions stored on program memory 104 and executed by processor 102. These parameters may be stored on data memory 106 and may be handled by-value or by-reference, that is, as a pointer, in the source code.

The processor 102 may receive data through all these interfaces, which includes memory access of volatile memory, such as cache or RAM, or non-volatile memory, such as an optical disk drive, hard disk drive, storage server or cloud storage.

It is to be understood that any receiving step may be preceded by the processor 102 determining or computing the data that is later received. For example, the processor 102 determines a summary and stores the summary in data memory 106, such as RAM or a processor register. The processor 102 then requests the summary from the data memory 106, such as by providing a read signal together with a memory address. The data memory 106 provides the requested data as a voltage signal on a physical bit line and the processor 102 receives the summary via a memory interface.

Figure 2:
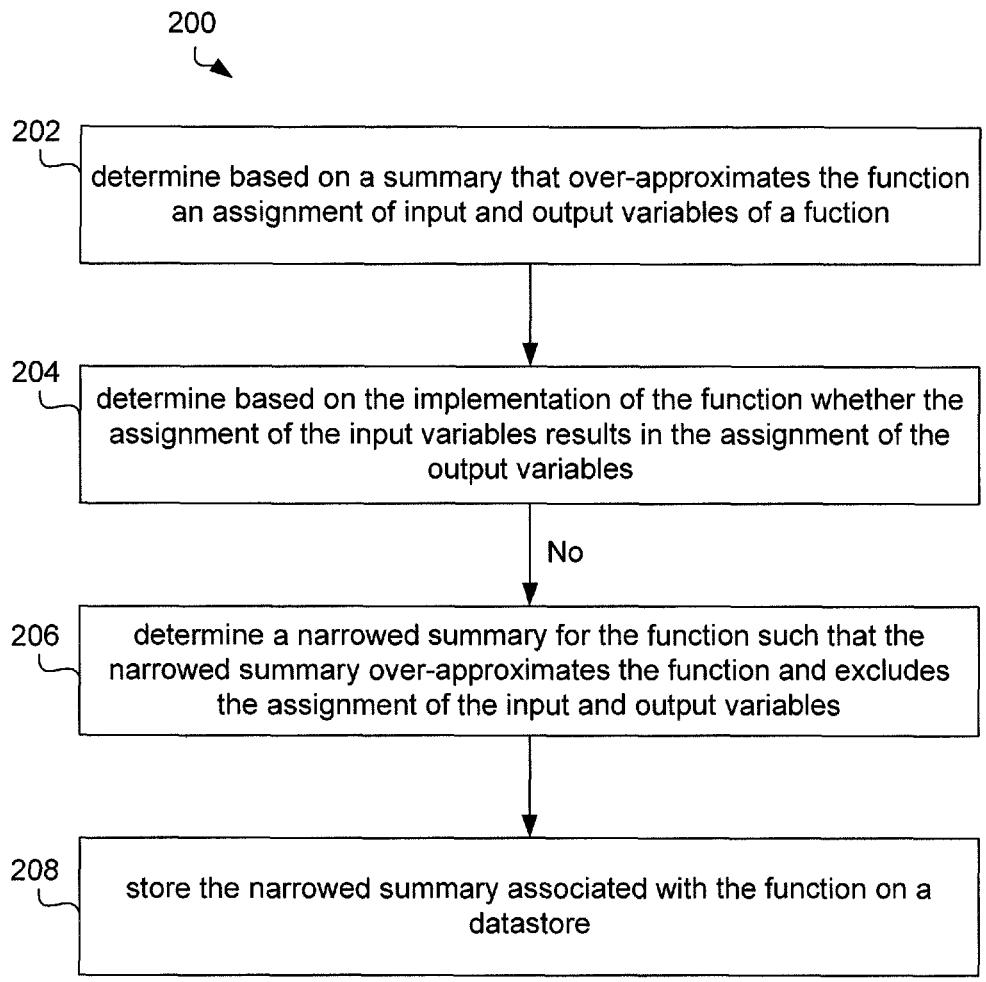
FIG. 2 illustrates a method as performed by processor for analysing a program based on source code.

FIG. 2 illustrates a method 200 as performed by processor 102 for analysing a program based on source code. Method 200 may be used as a blueprint for implementing the method 200 as a software program. The source code comprises a call to a function associated with a function implementation.

FIG. 3 illustrates an example program 300 represented by source code as stored as ASCII characters on data memory 106. Program 300 comprises a main function "main" 302 and a call 304 to an increment function "inc". The increment function is associated with a function implementation 306 and has first input variables "p" 308 and second input variable "q" 310 and output variable "r" 312. Program 300 further comprises a first assert statement 314 defining a predefined error state.

FIG. 4a illustrates a summary 400 for function "inc" 306 at the beginning of the first iteration of method 200. Summary 400 comprises a function name 402, a precondition 404 and a postcondition 406. As can be seen, summary 400 is the most liberal one, a logical representation of which is pre-post-condition pair (True, True), which means that the function can produce any output 312 for any inputs 308 and 310.

Referring also back to FIG. 2, processor 102 commences performing method 200 by determining 202, based on summary 400 for the function 306, an assignment of input variables 308 and 310 and output variable 312 of the call to the function such that the assignment allows the program to reach a predefined state, such as error state defined by assert statement 314. For example, the assignment to the output variable 312 may be '−1' and the assignment to the input variables 308 and 310 may be '5' and '8', respectively. In this first stage with initial summary 400, these assignments may be randomly chosen such that the given error condition 314 is met.

Processor 102 then determines 204, based on the implementation 306 of the function whether the assignment of the input variables 308 and 310 results in the assignment of the output variables.

In the example implementation 306 in FIG. 3, the assignment of '5' to the first input variable 'p' 308 and the assignment of '8' to the second input variable 'q' 310 results in the assignment of the output variable 'r' of '9'. This output is different to the previously determined assignment of '−1' to output variable 'r' 312. Therefore, processor 102 determines that the assignment of the input variables 308 and 310 does not result in the assignment of the output variable 312.

FIG. 4b illustrates a narrowed summary 420 of function 306 comprising function name 422, precondition 424 and postcondition 426. Upon determining that the assignment of the input variables 308 and 310 does not result in the assignment of the output variable 312, processor 102 determines 302 the narrowed summary 420 for the function 306 such that the narrowed summary 420 for the function 306 excludes the assignment of the input variables 308 and 310 and the output variable 312. As can be seen from FIG. 4b, the narrowed summary 420 excludes the assignments from the possible outcomes of function 306.

Further, processor 102 stores 208 the narrowed summary 420 associated with the function 306 on a datastore, such as by storing the function name 'inc' 422 in the same record as the precondition 424 and the postcondition 426.

In the next iteration, processor 102 can use the narrowed summary 420 to again determine based on the narrowed summary 420 for the function 306, an assignment of the input variables 308 and 310 and the output variable 312 of the call 304 to the function such that the assignment allows the 300 program to reach the error state 314.

As will be described in the more detailed description below, processor 102 may construct a rejection automaton to broaden the excluded assignments to determine a better narrowed summary. It is to be understood that throughout this specification unless noted otherwise an automaton refers to data stored on data memory 106 (including hard disk drives, RAM, processor registers etc.). This stored automaton data may comprise a list of states and a state transition table. The stored automaton data may also comprise a language that is accepted by the automaton.

FIG. 4c illustrates a further narrowed summary 440 comprising a function name 442, a precondition 444 and a postcondition 446. The precondition 444 '$p \geq 1$' is broader than '$p=5$' and '$q \geq 1$' is broader than '$q=8$' of precondition 424 in FIG. 4b. The postcondition 446 '$r \geq q+1$' when intersected with the precondition $q \geq 1$, is $r \geq 2$, which is narrower than postcondition 426 '$r!=-1$' in FIG. 4b. Therefore, the further narrowed assignment in FIG. 4c is more useful as it excludes a broader range of values that need not to be tried again in the next iteration.

Figure 5A:
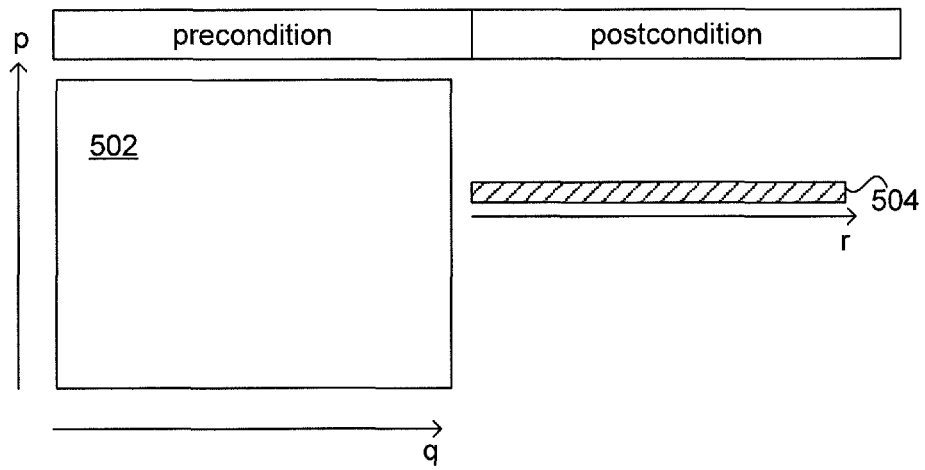
FIGS. 5a to 5c are graphical representations of the summaries in FIGS. 4a to 4c, respectively.
Figure 5B:
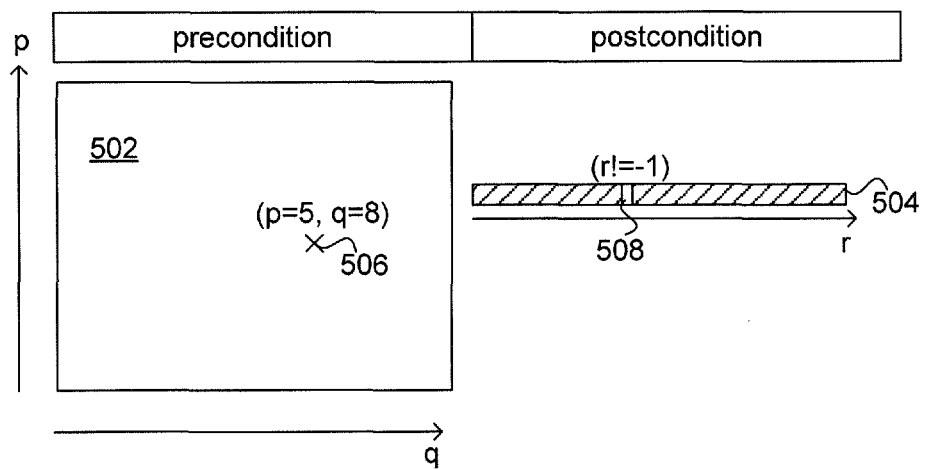
Figure 5C:
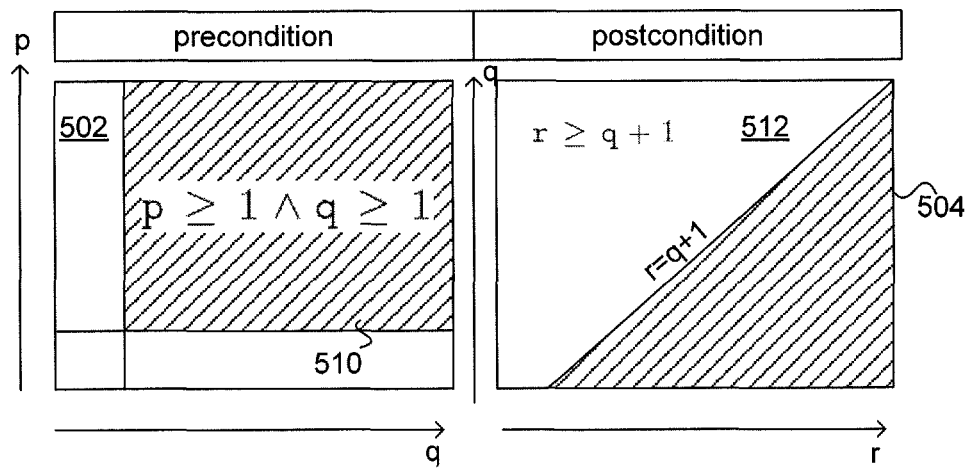

FIGS. 5a to 5c illustrate this graphically. FIG. 5a relates to FIG. 4a and illustrates an input space 502 of input variables representing the precondition and an output space 504 representing a postcondition. In FIG. 5a, there are no entries yet and any value in the precondition space 502 can result in any value of the postcondition space 504.

FIG. 5b relates to FIG. 4b and also illustrates the input space 502 and output space 504. The input space 502 has now one entry 506 corresponding to the precondition 424 in FIG. 4b and the postcondition space 504 has excluded one value 508 corresponding to postcondition 426 in FIG. 4b.

FIG. 5c relates to FIG. 4c and also illustrates the input space 502 and output space 504. The input space 502 has now an area 510 (that includes 506) corresponding to the precondition 444 in FIG. 4c and the postcondition space 504 has excluded range 512 corresponding to postcondition 446 in FIG. 4c. As can be seen by comparing FIG. 5b to FIG. 5c the precondition has been broadened while the postcondition has been narrowed.

Method 200 is a top-down modular (summary-based) approach and analyses inter-procedural programs by building function summaries on-demand and improving the summaries each time a function is analysed. Method 200 is sound, and complete relative to the existence of a modular Hoare proof for the program.

Processor 102 considers inter-procedural programs as follows: in each function, the variables are either input, output or local integer variables. In some examples, input variables can only be read, whereas output and local variables can be read and written to. Example program 300 has been given in FIG. 3. In some examples, there is no distinction between input, output and local variables.

The variable m is local to main and n is an output variable. The variables p,q are input variables of inc and r is the output variable. On a function call like n=inc(1, m) the left-hand-side variables (n) are assigned the values of the corresponding output variables (r) at the end of the computation of the callee (inc).

Functions can be annotated with assume and assert statements. An assume statement enforces some constraints on the values of the variables after its execution, e.g., at line 3 in main (304), the constraint holds. An assert statement asserts a predicate that should not be violated, otherwise the program contains an error. Processor 102 checks whether program 300 contains an execution that can violate an assert statement.

Each function is mapped to a control flow graph (CFG) that has a single entry and a single exit node.

Figure 6A:
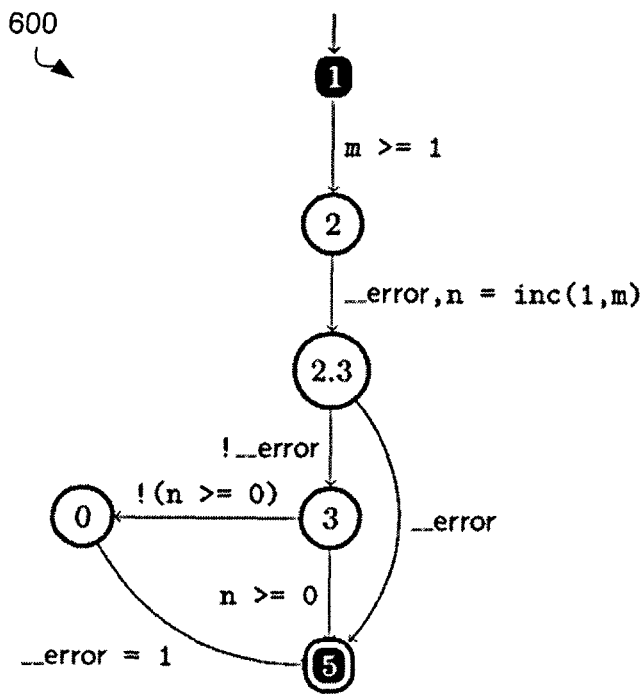
FIG. 6a illustrates a CFG for program main.
Figure 6B:
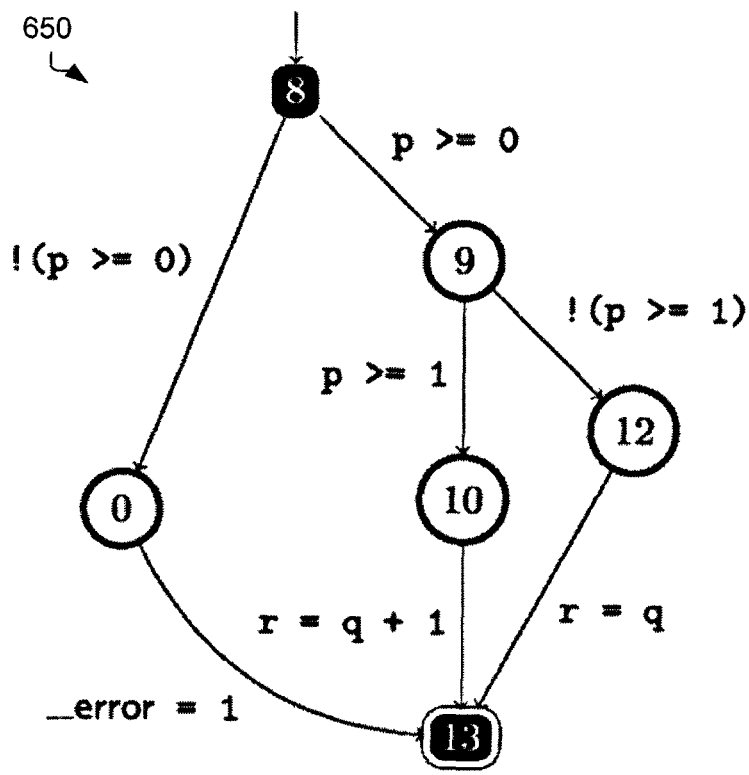
FIG. 6b illustrates a CFG for function inc.

FIG. 6a illustrates a first CFG 600 for main program 302 while FIG. 6b illustrates a CFG 650 for function inc 306.

To track assert statement violations across function boundaries processor 102 extends each function with an additional output variable, _error, which is initially 0 and is set to 1 when an assert fails. A function declaration that originally looks like proc inc(p,q):r thus internally becomes proc inc(p,q):_error,r. Moreover, processor 102 adds edges to the CFG 600 of each function to set the value of _error (8 to 0 and 0 to 13 in inc and 3 to 0 and 0 to 5 in main). As errors must propagate across function boundaries, the status of the _error variable must be updated after each function call, which can be done by assigning the caller _error variable with the value of the callee _error variable when it returns as depicted in 600 $A_{main}$.

Moreover as each function call may violate an assert statement, processor 102 adds nodes (2.3 in $A_{main}$) and edges (2.3 to 5 and 2.3 to 3 in $A_{main}$) to the CFG 600 of the caller to terminate the function if an error occurs during the call.

Program main 300 has two possible causes of error: one is to call inc 306 with a negative value for p (violating the assertion at line 8), and the other is to violate the assertion 314 on n at line 4 in main. The (partial) correctness of inc can be expressed by the Hoare triple (We use _error (resp. ¬_error) as a shorthand for the predicate that denotes "every valuation such that _error is 1 (resp. 0)") {¬_error} inc {¬_error} (error is the variable in inc).

Each Hoare triple may be stored on data memory 106 as an ASCII character string or as a custom data structure that allows more efficient storage of a large number of Hoare triples.

Partial correctness for inc can be checked using a trace refinement [1, 2] technique as follows. The CFG 650 of inc is viewed as an automaton (the initial state is entry and the final state is exit) that generates a language over the alphabet of labels of the CFG 650. To check whether the Hoare triple {¬_error} inc {¬_error} holds processor 102 tries to find a counter-example: if processor 102 succeeds processor 102 disproves the Hoare triple, if processor 102 fails the triple is valid.

This method works as follows:
1) Pick a path in the CFG 650 of inc from entry to exit and let w be the trace of this path (Traces of length n are written $a_1 \cdot a_2 \cdots a_{n-1} \cdot a_n$);
2) Add the pre/post conditions ¬_error/_error to the trace w and check whether the extended trace with pre/postconditions w'=!_error•w•_error is feasible (In statements we use ! for negation and in logical formulas the connector ¬.);
3) If w' is feasible processor 102 has found a counter-example and the Hoare triple is not valid. Otherwise, processor 102 removes w from the CFG 650.

If there are no accepting traces left, the Hoare triple is satisfied, and otherwise processor 102 starts again at step 1 using a refined CFG which does not contain w.

Notice that this process may not terminate. A key result of [1] is that a rejecting automaton, A(w), can be computed that accepts traces which are infeasible for the same reasons as w. Thus in the refinement step 206 (3), processor 102 can remove all traces accepted by A(w) and not just w.

The outcome of the trace refinement loop (when it terminates) is either a counter-example path or a confirmation that the Hoare triple holds. What is explained further below is that when the Hoare triple {P} f {Q} holds, processor 102 actually determines a better triple {P'} f {Q'} with P⇒P' (weaker assumption on the input) and Q'⇒Q (stronger constraint on the input/output relation.)

A goal is to extend the trace refinement technique to check whether Hoare triples hold for inter-procedural programs without inlining function calls.

A function call is viewed as a standard instruction: the call r=f(m) defines a relation between the input variables m and the output variables r (m and r are vectors of variables, however for clarity we omit vector notation). One difference to a standard instruction is that processor 102 does not exactly know this relation, which is the strongest postcondition operator for the function.

This can be remedied as follows: for each function call to f, processor 102 uses a summary which is an over-approximation of the strongest postcondition of the function f. A summary for inc could be the pair (p≥1, r≤q+1) or, if processor 102 does not know anything about inc, the most liberal summary (True, True) as in FIG. 4a, which means that the output variables can be assigned any value. To determine the validity status of {¬_error} main {¬_error} using function summaries, processor 102 tries to find a witness trace in main invalidating it. This works as follows:

1. Pick a path in the CFG of main from entry 1 to exit 5. Let $w_1$=m>=1•_error,n=inc(1,m)•_error be the trace of this path.
2. Using the semantics of each statement, and the over-approximate summary semantics (True,True) for the function call, check whether the trace $w_1$'=!_error•$w_1$•_error is feasible (add the pre/postcondition ¬_error and _error to $w_1$.)
3. $w_1$' is feasible, and processor 102 gets a witness assignment for the values of variables at each point in traces. This implicitly defines a pre/postcondition e.g., p=1∧q=1∧¬_error/_error for inc to make $w_1$' feasible.
4. To determine whether this pre/postcondition can be satisfied, processor 102 establishes the status of the Hoare triple {p=1∧q=1∧¬_error} inc {¬_error}. It holds and the witness pre/postcondition in main is infeasible but processor 102 gets a stronger valid Hoare triple, {p≥0∧¬_error} inc {¬_error} and stores it on data store 106. Then, processor 102 can use it as a summary $(G_1, S_1)$=(p≥0∧¬_error,¬_error) for inc.
5. processor 102 again checks the feasibility of $w_1$', this time with the new summary $(G_1, S_1)$ for inc. The path $w_1$' is now declared infeasible and thus $w_1$ can be ruled out (by a rejecting automaton on the alphabet of main.)
6. In a next round, processor 102 finds a new path in main from 1 to 5, the trace of which is $w_2$=m>=1•_error, n=inc(1,m)•!_error•!(n>=0)•_error=1. Again, processor 102 builds the extended trace with the pre/postconditions $w_2'$=!_error•$w_2$•_error and checks whether it is feasible. The result of this check is a new pair of pre/postconditions $(G_2, S_2)$=(p≥1∧ q≥1,r≥q+1) that can be added to the summary of inc.

7. Processor 102 again checks the feasibility of $w_2'$ with $(G_1,S_1)$ and $(G_2,S_2)$. $w_2'$ is infeasible with $(G_1,S_1)$,$(G_2,S_2)$ and this enables processor 102 to rule out $w_2$ in main.

8. In the last round, there is only one path left to explore in main but it cannot set _error. After checking this path, processor 102 establishes that {¬_error} main {¬_error} holds, but processor 102 has actually established a stronger triple {¬_error} main {¬_error∧ n≥m+1}.

Processor 102 uses a trace refinement approach combined function summaries. To prove {error=0} main {error=0}, processor 102 will try to find a counter-example, i.e., try to prove {error=0} main {error=1}. This amounts to reaching location 5 in main with error=1. It is noted that the notations !error, ¬_error and error=0 can be used interchangeably, which also applies for error,_error and error=1.

In one example, the trace refinement approach is based on Static Single Assignments (SSA) such that processor 102 assigns each variable exactly once.

FIG. 7a illustrates a further example original CFG 800, while FIG. 7b illustrates a modified CFG 750 after introducing SSAs. Existing variables in the original CFG 800 are split into versions. In the modified CFG 750 new variables are indicated by the original name with a subscript, so that every definition gets its own version.

The trace refinement approach works as follows: find a path from 1 to 5 in FIG. 6a; assume the path is m=1•error, n=inc(1,m)•error. Given the current summary for inc, this path is feasible. Indeed, if processor 102 encodes it as an SSA we get: m=1∧ $error_1$=0∧ True∧ $error_2$=1. If processor 102 employs an SMT-solver to determine whether this is satisfiable processor 102 gets a witness in the form of assignments for the variables: m=1,error=0 before the call to inc and error=1 after the call.

Given this witness, processor 102 investigates whether there exists a path in inc from a state satisfying error=0∧ p=1 to a state satisfying error=1. The trace refinement analysis now processes inc. Processor 102 has a candidate path from 8 to 13 which is !(p>=0•error=1). Encoding this path under the precondition yields $error_1$=0∧ $p_1$=1∧ !($p_1$≥0)∧ $error_2$=1. This formula is unsatisfiable and processor 102 can get some interpolant predicates (interpolants in the sequel) for this trace that capture the reason why this path is infeasible.

One reason is that taking the branch !(p>=0) is not possible under the current precondition. In a next round, processor 102 excludes this path and gets a witness trace in the CFG p>=0•p>=1•r=q+1. Combining it with the precondition error=0∧ p=1 and postcondition error=1 this is unsatisfiable. The reason processor 102 gets is an interpolant which is weaker than error=0∧ p=1 and is now error=0∧ p>=1. Under this condition, processor 102 determines that the post condition error=1 cannot hold and thus processor 102 has 1) determined that inc cannot satisfy m=1,error=0 before the call and error=1 after and moreover 2) established a new Hoare triple, {error=0∧ p>=1} inc {error=0} for inc which can now be used as a summary.

Using this new summary processor 102 can re-check the candidate path processor 102 found before in main. With the new summary this is infeasible and can be ruled out. Processor 102 can thus build an automaton that rejects this path and look for a new one. This time processor 102 gets the candidate witness path from 1 to 5 the trace of which is m=1•error,n=inc(1,m)•!error•!(n>=2)•error=1. Again processor 102 can use an SMT-solver to determine whether this is satisfiable and processor 102 uses the current knowledge processor 102 has for the function call. The formula is satisfiable and thus there exist values for the variables of inc before and after the call that make it true. In this case, the values require inc to satisfy {p=1} inc {r=0}. Processor 102 checks whether inc can satisfy this and the answer is no. Moreover, processor 102 gets a new Hoare triple {p>=1} inc {r=q+1}.

In one example, programs are written in a simple interprocedural programming language. There are no pointers, no global variables, and we may be restricted to integer variables. This last restriction is not important as integer variables are expressive enough to encode a very large class of problems in imperative programs e.g., array-out-of-bounds, NULL pointer dereferences.

We assume a set of predicates over variables e.g., in Quantifier-Free Linear Integer Arithmetic. Given a predicate φ, Var(φ) is the set of variables appearing in φ. We freely use the logical notation or set notation depending on which is best suited, e.g., given two predicates P and Q, we use P∧ Q (logical and) or P∩Q (set intersection). False corresponds to the empty set and True to the set of all possible values.

Program Statements.

The set of statements Σ is comprised of: (i) simple assignments e.g., y=t where y is a variable and t a linear term on variables, (ii) assume statements which are predicates over the variables and (iii) function calls of the form r1, r2, • • •, rk=f(d1, d2, • • •, dn) where f is a function and r1, r2, • • •, rk and d1, d2, • • •, dn are the input/output variables.

Given a simple assignment st and a predicate φ, post(st,φ) is the strongest condition that holds after executing st from φ. For an assume statement st, and predicate P the semantics are post(st,P)=P∧ st. The semantics of each function are given by the strongest postcondition operator post for the function (although we may not explicitly have it). The post operator extends straightforwardly to traces in Σ*.

Feasibility.

A trace t satisfies a pre/post condition (P,Q) if post(t,P)⊆Q. A trace t is (P,Q)-infeasible if post(t,P)∩ Q⊆False (or equivalently t satisfies (P,¬Q) i.e., post(t,P)⊆ ¬Q), otherwise it is (P,Q)-feasible. We let Infeas (P,Q) be the set of traces over Σ* that are (P,Q)-infeasible. A trace t is infeasible if it is (True,True)-infeasible (or if it satisfies (True,False)), otherwise it is feasible. We let Infeas be the set of infeasible traces over Σ*.

Trace Automaton, Function Automaton.

A trace automaton [16, 17] is a tuple A=(L,δ,$L_{init}$,$L_{exit}$) where L is a finite set of locations, δ⊆L×Σ×L is the transition relation, and $L_{init}$, $L_{exit}$⊆L (initial and final locations.) The language accepted by A is L(A) and is composed of traces in Σ* of paths from a $L_{init}$ location to $L_{exit}$ location. Programs are composed of multiple functions, each of them formally represented by a function automaton, which is an extended control flow graph (CFG). Given a function f, $A_f$ is the function automaton of f and is the CFG of f augmented with the edges setting the _error variable to encode assert statement violations. A function automaton has a single entry node and a single exit node. Each edge of a function automaton is labelled by a statement.

Formally $A_f$ is the trace automaton $(L_f, \delta_f, \{init_f\}, \{exit_f\})$ where:
- $L_f$ is a finite set of function locations;
- $\delta_f \subseteq L_f \times \Sigma \times L_f$ is the transition relation of the function that contains the edges (l,st,l') of the CFG of f augmented with the edges tracking and setting the _error variable (as exemplified by CFG 600 and 650);
- $init_f$ (resp. $exit_f$) is the entry (resp. exit) location of the function.

Interpolants

Given two predicates $\phi, \psi$ such that $\phi \wedge \psi$ is not satisfiable i.e., $\phi \wedge \psi$=False, an interpolant for $(\phi, \psi)$ is a predicate I on variables in $Var(\phi) \cap Var(\psi)$ such that 1) $\phi \Rightarrow I$ and $I \wedge \psi$=False. In words, I is weaker then $\phi$ but still retains the inconsistency with $\psi$.

This notion generalises to sequences of predicates $\phi_1 \wedge \phi_2 \wedge \cdots \phi_n$. Assume $\phi_1 \wedge \phi_2 \wedge \cdots \phi_n$=False. An interpolant for $(\phi_1, \phi_2, \cdots, \phi_n)$ is a sequence of predicates $I_0, I_1, \cdots, I_n$ such that: 1) $I_0$=True and $I_n$=False, 2) $\forall 1 \leq i \leq n, I_{i-1} \wedge \phi_i I_i$ and 3) $\forall 1 \leq i \leq n, Var(I_i) \subseteq (\cup_{j=1}^{i} Var(\phi_j)) \cap (\cup_{j=i+1}^{n} Var(\phi_j))$.

Interpolant for an Infeasible Trace

Let $t = st_1 \cdots st_k$ be an infeasible trace i.e., such that $post(st,t) \subseteq$ False. A sequence of predicates $I_0, I_1, \cdots, I_k$ is an interpolant for t if 1) $I_0$=True, 2) $\forall 1 \leq i \leq k, post(st, I_{i-1}) \subseteq I_i$ and 3) $I_k$=False. For t∈Infeas, we let itp(t) be the set of interpolants for t. By Craig's interpolation theorem, we know that $itp(t) \neq \emptyset$ for t∈Infeas.

Canonical Interpolant Automaton

Let $t = st_1 \cdots st_k$ be an infeasible trace and $I = I_0, I_1$, be an interpolant for t. The canonical interpolant automaton for (t,I) is a trace automaton $A_I^t = (L_I, \delta_I, \{init_I\}, \{exit_I\})$ as defined in [1].

An important property of canonical interpolant automata is that they accept sets of infeasible traces.

Theorem 1 ([1]) If t∈Infeas and I∈itp(t) then $L(A_I^t) \subseteq$ Infeas.

Checking Intra-Procedural Partial Correctness

We assume in this section that functions do not contain function calls. We show how to construct automata that accept traces that satisfy Hoare triples. This extends the results of [1]. A similar development is accounted for in [2] and we establish a new useful result given by Theorem 5.

Given a trace automaton A and two predicates P,Q (over the variables of A), the Hoare triple {P} A {Q} is valid for A iff $\forall t \in L(A), post(t,P) \subseteq Q$. Program (or function) correctness is defined by [1]: the Hoare triple {P} f {Q} is valid for function f if {P} $A_f$ {Q} is valid. A trace t is (P,Q)-infeasible if $post(t,P) \cap Q \subseteq$ False (or equivalently $post(t,P) \subseteq \neg Q$) otherwise it is (P,Q)-feasible. We let Infeas(P,Q) be the set of traces that are (P,Q)-infeasible. The validity of a Hoare triple {P} $A_f$ {Q} can be expressed in terms of language inclusion:

Theorem 2 {P} $A_f$ {Q} is valid iff $L(A_f) \subseteq$ Infeas(P,¬Q).

(P,Q) Interpolants

We extend the notion of inductive interpolants (e.g., from [1]) for infeasible traces to (P,Q)-interpolants for (P,Q)-infeasible traces. Let $t = st_1 \cdots st_k$ be a (P,Q)-infeasible trace. A sequence of predicates $I_0, I_1, \cdots, I_k$ is a (P,Q)-interpolant for t if 1) $P \Rightarrow I_0$, 2) $\forall 1 \leq i \leq k, post(st_i, I_{i-1}) \subseteq I_i$ and 3) $I_k \wedge Q$=False. For t∈Infeas(P,Q), we let $itp_{P,Q}(t)$ be the set of (P,Q)-interpolants for t. For t∈Infeas, we let itp(t) be the set of interpolants for t. By Craig's interpolation theorem [2], we know that $itp(t) \neq \emptyset$. It follows that:

Lemma 1 If t∈Infeas(P,Q) then $itp_{P,Q}(t) \neq \emptyset$.

Interpolant Automaton

Let $t = st_1 \cdots st_k$ be an infeasible trace and $I = I_0, I_1, \cdots, I_k$ be an interpolant for t. The canonical interpolant automaton for (t,I) is a trace automaton $A_I^t = (L_I, \delta_I, \{init_I\}, \{exit_I\})$ as originally defined in [1]. An important property of canonical interpolant automata is that they accept sets of infeasible traces.

Theorem 3 If t∈Infeas and I∈itp(t) then $L(A_I^t) \subseteq$ Infeas.

We extend the definition of canonical interpolant automata to (P,Q)-interpolant automata. Let $t = st_1 \cdot st_2 \cdots st_k \in$ Infeas(P,Q) and $I = I_0, I_1, \cdots, I_k \in itp_{P,Q}(t)$. Then t is also in Infeas($I_0$,Q). Let $t' = I_0 \cdot t \cdot Q$. As t∈Infeas($I_0$,Q), we have t'∈Infeas and moreover $I' = True, I_0, \cdots, I_k$, False is an interpolant for t'. We can then build the canonical interpolant automaton $A_{I'}^{t'} = (L_{I'}, \delta_{I'}, \{init_{I'}\}, \{exit_{I'}\})$ for (t',I').

We define the corresponding (P,Q)-interpolant automaton for (t,I) as the tuple $A(P,Q)_I^t = (L_I, \delta_I, L_{init_I}, L_{exit_I})$ where: 1) $L_I = L_{I'} \setminus \{L_{init_{I'}}, L_{exit_{I'}}\}$, 2) $L_{init_I} = \{l \in L_{I'} | (init_{I'}, P, l) \in \delta_{I'}\}$ and $L_{exit_I} = \{l \in L_{I'} | (l, Q, exit_{I'}) \in \delta_{I'}\}$ and 3) $\delta_I = \delta_{I'} \cap (L_I \times \Sigma \times L_I)$. An important property of (P,Q)-interpolant automata is that they accept sets of (P,Q)-infeasible traces.

Theorem 4 If t∈Infeas(P,Q) and I∈$itp_{P,Q}(t)$ then $L(A(P,Q)_I^t) \subseteq$ Infeas(P,Q).

Intraprocedural Trace Refinement for Partial Correctness.

We now show that a trace refinement software module can be executed by processor 102 to obtain new stronger Hoare triples for function f.

FIG. 8 illustrates a first algorithm 800 as executed by processor 102 to determine a stronger Hoare triple.

A Hoare triple {P'} f {Q'} is stronger than {P} f {Q} if $P \Rightarrow P'$ and $Q' \Rightarrow Q$. If algorithm 800 terminates and the input triple {P} f {Q} is valid, processor 102 has implicitly proved a stronger Hoare triple. The new Hoare triple can be built by collecting the intermediate interpolants built each time a (P,¬Q)-infeasible trace is discovered (line 6 in Algorithm 800).

Lemma 2 Let t∈Infeas(P,¬Q) and $I = I_0, \cdots, I_k \in itp_{P, \neg Q}(t)$, then the Hoare triple {$I_0$} A(P,¬Q)($_I^t$){$I_k$} is valid.

Line 9 of Algorithm 800 stores the interpolants on data store 106 each time a trace t is declared (P,¬Q)-infeasible. It collects the interpolants $I_0$ and $I_k$ and stores them in the arrays $P_n$ and $Q_n$ (each interpolant automaton $A_n$ is also stored) on data store 106. If the triple is valid, it means that the interpolant automata $A_i$ cover the set of traces of $A_f$ and processor 102 can deduce that $A_f$ satisfies the pre/postcondition $\cap_{i=1}^n P_i$ and $\cup_{i=1}^n Q_i$.

Theorem 5 If Algorithm 800 terminates and returns itp (P',Q') then {P'} $A_f$ {Q'} is valid and stronger than {P} $A_f$ {Q}.

Algorithm 800 is correct, as if it terminates it either returns:
i) path(t), and then {P} f {Q} does not hold and t is a witness path such that $post(t,P) \cap \neg Q \not\subseteq$ False, or
ii) itp(P',Q') and then {P'} f {Q'} holds and $P \Rightarrow P'$ and $Q' \Rightarrow Q$.

Condition i) holds because there are no function calls and the trace t selected at line 2 is such that $post(t,P) \cap \neg Q \not\subseteq$ False. As post is exact for statements which are not function calls, t is counter-example. If Algorithm 800 (Hoare$_1$) returns itp(P',Q'), Theorem 5 holds proving correctness in this case.

It may be difficult to ensure termination of Algorithm 800 but similar to the trace refinement algorithm of [1], we can ensure incrementality and progress.

Incrementality is relative to the Hoare triple processor 102 is checking, and means that once a (P,¬Q)-interpolant automaton has been computed by processor 102 it holds during the call to Hoare$_1$(f,P,Q) and processor 102 may never have to withdraw it. Progress is ensured because if processor 102 discovers a (P,¬Q)-infeasible trace t at the n-th iteration of the while loop, it is accepted by the corresponding automaton $A_n$ and thus may not be found in subsequent rounds.

As pointed out in [1], soundness of the algorithm 800 i.e., if it terminates and declares a program error-free the program is actually error-free, is implied by Theorem 5. Completeness i.e., if a program is error-free, Algorithm 800 (Hoare$_1$) can declare it error-free, holds.

Remark 1 An even weaker precondition may be enough to enforce $\cup_{i=1}{}^n Q_i$. This is discussed in further below.

Lazy Strongness

In this section, we show how processor 102 gets better Hoare triples when processor 102 has proved that $\{P\}$ f $\{Q\}$ holds. We proved in Theorem 5 that the Hoare triple $\{\cap_{i=1}{}^n P_i\}$ $A_p$ $\{\cup_{i=1}{}^n Q_i\}$ obtained during the trace refinement was stronger than $\{P\}$ f $\{Q\}$. It turns out that processor 102 can compute better triples in a sense that will be defined shortly.

However, as in the end, processor 102 takes the intersection of the $P_i$'s processor 102 tries to make each $P_i$ as large as possible to apply it for large sets of inputs. Moreover, there are three different reasons why a trace t (line 2) of Algorithm 800 may be (P,¬Q)-infeasible:

[C1] the trace t is infeasible whatever the precondition P is i.e., post(True,t)⊆False. In this case, processor 102 learns the triple $\{$True$\}$ $A(P,\neg Q)_f^t$ $\{$False$\}$ but processor 102 may discard traces in $L(A(P,\neg Q)_f^t)$ as they must be infeasible. Thus processor 102 can simply store the interpolant automaton $A(P,\neg Q)_f^t$ and use the refined language language $L(A\ f)\backslash L(A(P,\neg Q)_f^t)$ instead of $L(A\ f)$ when processor 102 analyses f later on. Also the triple $\{$True$\}$ $A(P,\neg Q)_f^t$ $\{$False$\}$ may not contribute to $\{\cap_{i=1}{}^n P_i\}$ $A_p$ $\{\cup_{i=1}{}^n Q_i\}$ so processor 102 can discard it.

[C2] the trace t is infeasible under assumption P i.e., post(P,t)⊆False, but feasible otherwise i.e., post(True, t)⊈False. In this case the function cannot terminate if P is true on the input variables at the beginning. Hence the interpolant $I_k$ (line 9 of Algorithm 800 is False). The interpolant $(P_n,Q_n)$ is thus of the form $(P_n,$ False$)$.

[C3] the last case is when t is (P,¬Q)-infeasible post(P,t)∩¬Q⊆False but feasible under P i.e., post(P,t)⊈False. As we do not alter the input variables, we also have post(True,t)∩(P∧¬Q)⊆False. Indeed, post(P,t)=post(True,t)∩P (as P is a predicate on the input of f and thus remains true along any computation.) It follows that post(P,t)∩¬Q⊆False implies post (True,t)∩(P∧¬Q)⊆False. In this case, if K is an interpolant for the pair (post(True,t),P∧¬Q) then $\{$True$\}$ $A(P,\neg Q)_f^t$ $\{K\}$ holds.

To exemplify what is happening, assume processor 102 is checking whether the triple $\{$p=0$\}$ inc $\{$r=2$\}$ holds. Using Algorithm 800 processor 102 gets the stronger triple $\{$p≤0$\}$ inc $\{$r≤1$\}$, with inc defined in FIG. 3. Now assuming processor 102 computes an interpolant as defined by Item [C3] above, processor 102 gets a Hoare triple $\{$True$\}$ inc $\{$r≤p+1$\}$. This new triple is stronger than the previous one in the sense that, if used under the conditions of the previous one, it gives a stronger conclusion i.e., (r≤p+1)∧(p≤0) implies r≤1.

We now define a notion of lazy strongness that accounts for the previous remark. Let $\{P\}$ f $\{Q\}$ and $\{P'\}$ f $\{Q'\}$ be two valid Hoare triples for f, and recall that P and P' are on the input of f and f does not modify the input variables. The triple $\{P'\}$ f $\{Q'\}$ is lazily stronger than $\{P\}$ f $\{Q\}$ if PP' and Q'∧PQ. In words, it means that under the assumptions P, the conclusion Q' is stronger than Q. As Q is only valid under P anyhow, the triple $\{P'\}$ f $\{Q'\}$ does not loose any information captured by the triple $\{P\}$ f $\{Q\}$. Notice that the relation stronger than implies lazily stronger than. In the end, given two Hoare triples, if one is lazily stronger than another processor 102 only keeps the lazily stronger one as it retains the information of the weaker when the precondition is satisfied.

We can now prove that under [C3] above, processor 102 can obtain a lazily stronger triple than the one defined by $\{P_n\}$ f $\{Q_n\}$.

Proposition 1. Assume t is (P,¬Q)-infeasible i.e., post(P, t)∩¬Q⊆False but feasible under P i.e., post(P,t)⊈False. Let $P_n$ and $Q_n$ be the interpolants computed by Algorithm 800, lines 6 and 9. Then post(True,t)⊈False and $\{$True$\}$ f $\{$post(True,t)$\}$ holds and is lazily stronger than $\{P_n\}$ f $\{Q_n\}$.

Proof. post(True,t)⊈False is ensured because post(P,t)⊈False. The triple $\{$True$\}$ f $\{$post(True,t)$\}$ holds trivially. Lazy strongness holds because the predicate $P_n$ constrains input variables only and these variables are not modified by the statements in the function f. By definition of $(P_n,Q_n)$, we have post$(P_n,t)\subseteq Q_n$, and post(P,t)= post(True,t)∩$P_n$ which implies K∩$P_n\subseteq Q_n$ i.e., lazy strongness.

Proposition 1 has an extremely nice consequence on the computation of the new Hoare triple (line 10, Algorithm 800). We let P and Q be two sets of predicates that are initially $\{$False$\}$ and $\{$True$\}$. By C1, C2, C3 above, processor 102 can refine the construction of the predicates $(P_n, Q_n)$ according to the cause of (P,¬Q)-infeasibility of a trace t and update the sets P and Q as follows:

[K1] t is (True,True)-infeasible: we store the interpolant automaton but discard $P_n$ (True) and $Q_n$ (False) i.e., P and Q are left unchanged.

[K2] t is (P,True)-infeasible but t is not (True,True)-infeasible. In this case we add interpolant $P_n$ to P and discard $Q_n$ which is False.

[K3] t is (P¬Q)-infeasible but not (P,True)-infeasible. We add post(True,t) to Q.

When the algorithm terminates processor 102 stores two sets P and Q with the following properties:

i) every predicate added to P characterizes a (P,True)-infeasible trace and starting in the union of the sets in P function f cannot terminate so every postcondition holds;

ii) every predicate added to Q describes a postcondition of a (True,True)-feasible trace t.

Inter-Procedural Trace Refinement

Function Summaries.

Let f be a function with (formal) input parameters $\bar{x}=x_1$, $x_2, \ldots, x_k$ and output parameters $y=y_1, y_2, \bullet\bullet\bullet, y_n$. In this example, input variables are not modified by a function and there are no global variables but the method applies as well for the general case with mixed (input/output variables) and global variables.

A summary S for f is a set of pairs of predicates $(P_i,Q_i)_{1\leq i\leq n}$ where Var$(P_i)\subseteq \bar{x}$ and Var$(Q_i)\subseteq \bar{x} \cup \bar{y}$, while we view the vector $\bar{x}$ as a set and can check for inclusion. This summary can be interpreted as a predicate $\wedge_{i=1}{}^n(P_i \Rightarrow Q_i)$. In the sequel we will use variable substitution and we will write summaries as S as $S(\bar{x},\bar{y})=\wedge_{i=1}{}^n(P_i(\bar{x}) \Rightarrow Q_i(\bar{x},\bar{y}))$.

Post-Condition of a Summary.

The exact post operator may not be explicitly available for functions. Processor 102 over-approximates it while retaining enough information to prove a property of interest. Processor 102 approximates the post operator for functions using summaries.

A context C is a mapping as performed by processor 102 from functions to summaries such that for each function f in the program, C(f) is a summary for f. Given a context C we define an associated summary post operator $\widehat{post}$ as follows:

$$post(C, st, \varphi) = \begin{cases} post(st, \varphi) & \text{if } st \text{ is not a function call} \\ \exists r \cdot \varphi \wedge C(f)(m, r) & \text{if } st \text{ is the function call } r = f(m) \end{cases}.$$

In other words, only function call post operators are computed using summaries, other statements' strongest postcondition operators are preserved. As a function call r=f(m) only alters the output variables r, the projection of the predicate ϕ on the other variables, i.e., ∃r.ϕ, remains true after the execution of r=f(m). Moreover the target result variable r should satisfy the constraints between the formal input and output variables C(f)(m,r) of f.

The definitions we introduced so far are also valid for the post operator: a trace t is (P,Q)-infeasible in context C if post(C,t,P)∩Q⊆False, otherwise it is feasible (in this context). Notice also that if a context provides over-approximations for function calls i.e., post(st,P)⊆post(C,st,P) for a function call st, infeasibility in C implies infeasibility with the exact strongest postcondition post operators for the functions called. However, a trace may be (P,Q)-feasible in a context C, but not (P,Q)-feasible, i.e., with the exact post operator for each function.

Example 1
Consider program $P_1$ and the function automata A main and A inc given in 1. Let C be the context C(main)=(True, True) and C(inc)=(True,True). The trace t=m>=1•_error, n=inc(1,m)•_error is (¬_error,_error)-feasible in C:

$$post(C, m>=1, \neg\_error) = \neg\_error \wedge m \geq 1 \qquad (1)$$

$$post(C,\_error, n=inc(1,m,), \neg\_error \wedge m \geq 1) = \\ m \geq 1 \wedge True \qquad (2)$$

$$post(C,\_error, m \geq 1) = m \geq 1 \wedge \_error \qquad (3)$$

However, it is feasible only because our summary for inc is too coarse.

C is an over-approximating context (in short over-approximation) if for every function automaton A f, every trace t∈L(A f) and every predicate ϕ, post(t,ϕ)⊆post(C,t,ϕ). We give a simple sufficient condition to ensure that a summary is an over-approximation of a function:

Proposition 2. Let (P,Q) be two predicates on the input and input/output variables of f such that {P} f {Q} holds. Then post(r=f(m),ϕ)⊆post(C:f↦{(P, Q)},r=f(m),ϕ).

Proposition 2 generalises to summaries that are sets of pairs for every function.

Theorem 6 Let C be an over-approximation, f a function and (P,Q) be two predicates on the input and input/output variables of f such that {P} f {Q} holds. The context C' defined by C'(h)=C(h) for h≠f and C'(f)=C(f)∪{(P,Q)} is an over-approximation.

Figure 9B:
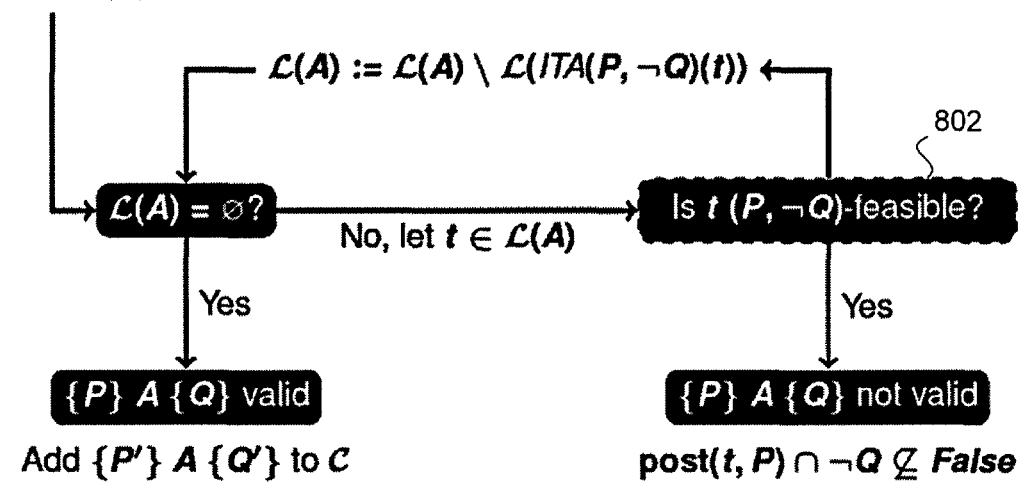

FIG. 9a illustrates a second algorithm 900 as executed by processor 102 for inter-procedural modular trace refinement. FIG. 9b illustrates the second algorithm 900 as a flow chart 950. The main difference between Algorithm 800 and Algorithm 900 is in how feasibility of a trace is checked using the summaries (Line 3). This step is more involved.

Figure 10B:
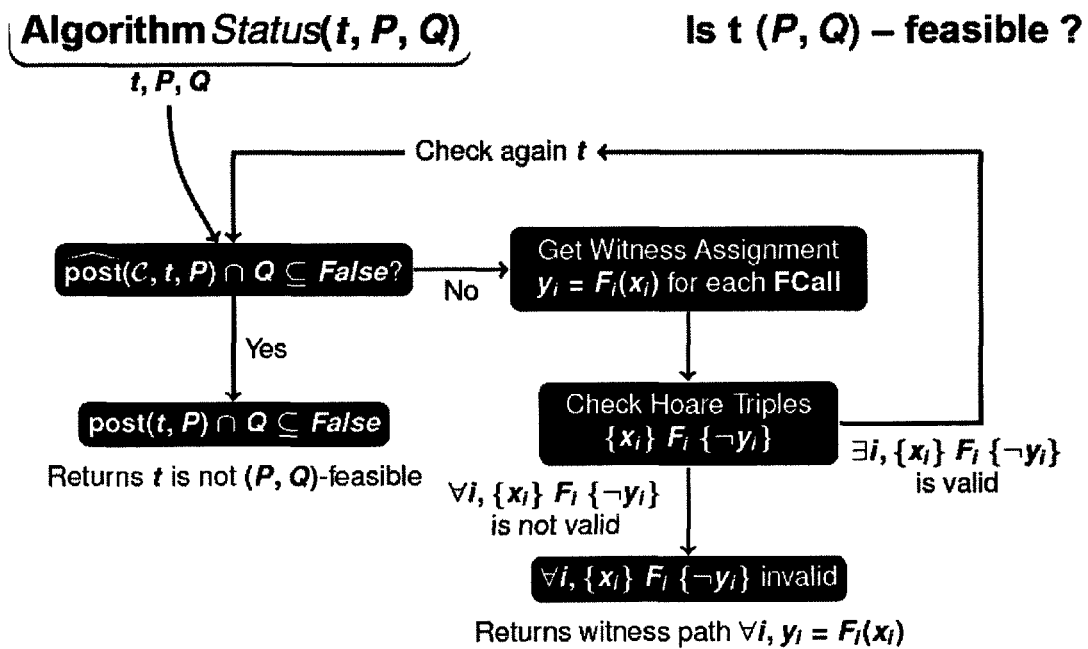

FIG. 10a illustrates a third algorithm 1000 as executed by processor 102 for checking feasibility of a trace. FIG. 10b illustrates the third algorithm 1000 as a flow chart 1050.

Algorithm 900, Hoare$_2$ in the sequel, determines the status of a candidate Hoare triple {P} A$_f$ {Q} and either returns an inter-procedural (counter-example) path or a stronger triple {P'} A$_f$ {Q'}. An inter-procedural path for a trace t for function g is a mapping path( ) such that
for statements st in t that are not function calls, path(st)=st,
for st a function call r=f(m), path(st) is an inter-procedural path for f.

In one example, the context variable C is a global variable and is initialised with default summaries e.g., (True,True) for each function as shown in FIG. 4a for function inc. In Algorithm 900, Line 3, the call to Status(t,P,¬Q) 802 (Status is defined in Algorithm 1000) returns the infeasibility status of t: it is either (P,¬Q)-feasible and (True,path(t)) is returned or C-(P,¬Q)-infeasible and (False,-) is returned, where the notation C-(P,¬Q) refers to. Hoare$_2$ is very similar to Hoare$_1$ (Algorithm 800) once the status of a trace t is determined:
if t is C-(P,¬Q)-infeasible i.e., Status(t,P,¬Q)=(False,-), then it is (P,¬Q)-infeasible (C is an over-approximation) and processor 102 can compute an interpolant automaton to reject similar traces (Lines 7 to 10 in Algorithm 900). Note also that the summary for the currently analysed function is updated (Line 11).
otherwise t is (P,¬Q)-feasible i.e., Status(t,P,¬Q)=(True, path(t)) and t is an inter-procedural counter-example.

Status(t,P,Q) is defined in Algorithm 1000 and determines the (P,Q)-feasibility of a trace t, and in doing so may recursively call Algorithm 900 (Line 8). Algorithm 1000 determines the status of a trace t=st$_1$st$_2$ • • • st$_k$ as follows:
Function call statements are collected and stored into FCall (Line 2.) Then the path is initialised with the default values for the statements that are not function calls (line 3).
the (P,Q)-feasibility status of t is determined in an iterative manner:
if t is C-(P,Q)-infeasible, the condition of Line 5 is false and the else statement on Line 16 is executed. This implies it is (P,Q)-infeasible as C is an over-approximation, and we can return (False,⊥) (the second component does not matter as in this case it is discarded.)
if t is C-(P,Q)-feasible, we obtain some before/after witness values for the variables in each function call and store them in pairs (v$_i$,μ$_i$),i∈FCall. The for-loop at line 8 checks each function call w.r.t. to the feasibility of its before/after witness values. This is done by recursively calling Hoare$_2$ (algorithm 900) on the callees by claiming that the witness assignment is not realisable by the function. The result of these recursive calls to Hoare$_2$ are either a witness trace path(u) or a pair of predicates itp(P',Q'). If processor 102 gets a witness trace processor 102 stores it in path(st$_i$) (Line 12) on data store 106, otherwise processor 102 does nothing (but the context C has been updated by the call to Hoare$_2$.)

In this section we show how processor 102 determines whether a trace containing function calls is feasible or not. The starting point is a candidate trace t the (P, Q)-feasibility of which is determined using summaries i.e., a context C. We thus say that trace t is C-(P,Q)-feasible or C-(P,Q)-infeasible. As mentioned before, C-(P,Q)-feasibility does not always imply (P,Q)-feasibility. However if the context C is an over-approximation, C-(P,Q)-infeasibility implies (P,Q)-infeasibility.

We illustrate the main ideas of Algorithm 900 which extends Algorithm 800 to inter-procedural analysis. Assume processor 102 aims to prove a Hoare triple {P} g {Q}. Processor 102 tries to find a witness trace t that invalidates it (line 2 of Algorithm 900.) Let t=w•r=f(m)•w' be a C-$(P,\neg Q)$-feasible trace i.e., post(C,t,P)$\cap \neg Q \not\subseteq$ False (line 5.) Further assume there is a single function call to f in t and f itself does not contain any function calls. C-$(P,\neg Q)$-feasibility is computed using the current summary C(f) for f. The only reason t might be $(P,\neg Q)$-infeasible is that the summary for f is too liberal. But if t is C-$(P,\neg Q)$-feasible processor 102 can get a witness assignment for the variables at each point in the trace (e.g., using an SMT-solver) and extract the values $m_0$ for m and $r_0$ for r before and after the call to f. Now processor 102 can perform Algorithm 800 to check whether a trace in f can realise the witness assignment. To do this processor 102 claims the Hoare triple $\{\bar{x}=m_0\}$ f $\{\neg(\bar{y}=r_0)\}$ (assume $\bar{x}$ (resp. $\bar{y}$) is f formal input (resp. output) parameters) and uses Algorithm 800 to determine the answer:

either $\{\bar{x}=m_0\}$ f $\{\neg(\bar{y}=r_0)\}$ holds and the witness assignment values before and after the call to f are not realisable. In this case processor 102 still made some progress as Algorithm 800 built a Hoare triple $\{P'\}$ f $\{Q'\}$ with $\bar{x}=m_0 P'$ and $Q'\neg(\bar{y}=r_0)$. Processor 102 can thus check again the $(P,\neg Q)$-feasibility of t but with the better context C' where C'(f)=C(f)$\cup \{(P',Q')\}$. Notice that (P',Q') will not allow the same witness assignment to be found in the next round.

or processor 102 finds a $(\bar{x}=m_0,\bar{y}=r_0)$-feasible trace in f which makes the witness t overall $(P,\neg Q)$-feasible.

In this example, the context variable C is a global variable and is initialised with default summaries e.g., (True,True) for each function as in FIG. 4a for function inc. When a Hoare triple does not hold, processor 102 attempts to return a interprocedural witness path. To do this processor 102 associates with each statement in a trace t an interprocedural path. A interprocedural path for t is a mapping path such that for statements st in t that are not function calls, path(st)=st, for st a function call r=f(m), path(st) is interprocedural path for f.

One difference between Algorithm 800 and Algorithm 900 is in checking whether a trace is feasible using the summaries. This new step is detailed in Algorithm 1000. Line 3 of Algorithm 900 determines the status of a trace t containing function calls. If Status(t,P,$\neg$Q) is (True,path(t)) then a witness trace has been found for each function call in t and the inter-procedural trace is given by path(t). Otherwise Status(t,P,$\neg$Q) is (False,$\perp$) and the trace t has been proved $(P,\neg Q)$-infeasible. In the latter case processor 102 can refine the CFG and add an interpolant automaton as described by Lines 7 to 10 in Algorithm 900.

Algorithm 1000 determines the (P,Q)-feasibility status of a trace t, and to do so, may recursively call Algorithm 900 (Line 8). Algorithm 1000 determines the status of a trace $t=st_1 st_2 \cdots st_k$ as follows:

A witness trace for each standard statement in t is initialised and indices of function calls collected in FCall (lines 1 and 2).

the (P, Q)-feasibility status of t is determined in an iterative manner:

if t is C-(P,Q)-infeasible (condition of Line 5 is false and the else statement Line 16 is executed) then it is (P,Q)-infeasible and processor 102 can return (False,$\perp$) (the second component does not matter as in this case it is discarded.)

if t is C-(P,Q)-feasible, processor 102 obtains some before/after witness values for the function calls and stores them in pairs $(v_i,\mu_i),i\in$FCall on data store 106.

The for-loop at line 8 checks each function call w.r.t. to the realisability of its Before/after witness values. This is done by calling Hoare$_2$ (algorithm 2) on the callees. The result of these calls are either a witness trace path(u) or a pair of predicates itp(P',Q'). If processor 102 gets a witness trace we store it in path($st_i$), otherwise processor 102 does nothing (but the context C has been updated.)

Remark 2 One important feature of the algorithm to build the canonical interpolant automata [16, 17] is the ability to add loops to the initial automaton that encodes the infeasible trace. Adding loops is facilitated if processor 102 can compute a safe over-approximation of the post operator for the statements to be added, and this is satisfied here as all contexts are over-approximations.

Soundness and Completeness of Algorithm 900.

We give an inductive proof that Algorithm 900 is correct if it terminates. This assumes that post operators can be computed exactly on statements that are not function calls. As Hoare$_2$ can contain recursive calls, the proof runs by induction on the number of times Hoare$_2$ is called in the recursion.

Theorem 7 Let C be an initial over-approximation. If Hoare$_2(A_f,P,Q)$ terminates and there are less than n calls to Hoare$_2$, then:

the result of Hoare$_2(A_f,P,Q)$ is correct i.e., (a) if it returns itp(P',Q'), $\{P'\}$ $A_f$ $\{Q'\}$ holds, with PP', Q'Q, (b) if it returns path(t) then path(t) is a finite interprocedural path and post(P,path(t))$\cap \neg Q \not\subseteq$ False, during the computation C is always an over-approximation.

Theorem 7 proves that Hoare$_2$ is sound by a.1). If the Hoare triple is not valid, and if the post operator is exact then the returned counter-example is also feasible by a.2). The algorithm is also trivially complete (as in [1]) relative to the existence of a modular Hoare proof for the program: if a program is error-free, there exists a context C such that we can establish correctness.

The assumption that the post operator is exact for simple statements can be lifted still preserving soundness. An over-approximation for post (e.g., for programs with non linear assignments, we can compute a linear over-approximation) ensures soundness. However, we may return a witness counter-example which is infeasible, and get some false positives.

Lazy Summaries.

In Algorithm 900 (line 12) processor 102 computes summaries that are stronger than the initial valid triple $\{P\}$ f $\{Q\}$. However, processor 102 may get better summaries. To exemplify what is happening, assume processor 102 is checking whether the triple $\{p=0\}$ inc $\{r=2\}$ holds, with inc defined in FIG. 3. Using Algorithm 900 processor 102 gets the stronger triple $\{p\leq 0\}$ inc $\{r\leq 1\}$. Processor 102 can actually get a better summary in some cases (R3 below). Indeed, there are three reasons why a trace t might be $(P,\neg Q)$-infeasible:

R1 t is infeasible i.e., post(True,t)$\subseteq$False. In this case, processor 102 learns the triple $\{\text{True}\}$ $A(P,\neg Q)_f^t$ $\{\text{False}\}$, but can discard it as it does not contribute to the computation of the result at line 12. Moreover, the interpolant automaton $A(P,\neg Q)_f^t$ is always valid and rejects infeasible traces, so processor 102 can use it each time processor 102 analyses f later on.

R2 t is infeasible under assumption P, i.e., post(P,t)$\subseteq$False, but feasible otherwise i.e., post(True,t)$\not\subseteq$ False. Hence the interpolant $I_k$ (line 12 of Algorithm 2) is False and $(P_n,Q_n)$ is therefore of the form $(P_n,\text{False})$.

R3 t is $(P,\neg Q)$-infeasible, i.e., post(P,t)$\cap \neg Q \subseteq$False, but feasible under assumption P alone i.e., post(P,t)$\not\subseteq$ False.

When R3 occurs, and as processor 102 does not alter the input variables, processor 102 also has post(True,t)∩ (P∧¬Q)⊆False. Indeed, post(P,t)=post(True,t)∩P (as P is a predicate on the input of f and thus remains true along any computation). In this case, if K is an interpolant for the pair (post(True,t),P∧¬Q) then {True} A(P,¬Q)$_f^t$ {K} holds. This triple is more general than {I$_0$} A(P,¬Q)$_f^t$ {I$_k$} as the precondition is True, but the conclusion K is not guaranteed to imply I$_k$.

However, it is desired to determine stronger and stronger summaries. If a trace t is diagnosed feasible under a context C and a witness assignment is w, but t is infeasible, processor 102 gets an updated context C'. It is desired that w is not a witness assignment anymore in the updated context C'. Processor 102 can check whether the summary (True,K) is precise enough to ensure this progress property.

The notion is lazy strongness: (True,K) is lazily stronger than (I$_0$,I$_k$) if I$_0$∧KI$_k$. This means that (True,K) is valid for a larger set of inputs, but retains the precise postcondition I$_k$ when I$_0$ holds on the input. This implies that an infeasible witness assignment for a trace t will still be infeasible under a new context, where processor 102 uses (True,K) instead of (I$_0$,I$_k$). It thus preserves the progress property of the algorithm. Using this method, processor 102 gets the lazily stronger summary {True} inc {r≤p+1} instead of {p≤0} inc {r≤1}. This implementation supports the test for lazy strongness and uses (True,K) whenever it is lazily stronger than (I$_0$,I$_k$).

Recursive Programs

To handle recursive programs, processor 102 can perform the following Hoare recursion rule: to prove that a recursive program, say f, satisfies a Hoare triple {P} f {Q}, processor 102 can assume hoarePfQ on the recurive call to f and try to prove f. This can be accommodated as follows: assume the body f contains a call to f itself and processor 102 aims to prove the Hoare triple {P} f {Q}. Then it suffices to view the recursive call as a call to a fresh function, say f'. Then processor 102 can assume that the triple {P} f' {Q} holds for f' to prove it holds also for f. Processor 102 can do this by assuming that the summary (P,Q) holds for f', and use our refinement scheme to prove/disprove it for f.

Processor 102 ensures that during the proof process, the summary for f' remains constant which can be achieved by choosing f' to be a function with no instruction. This still ensures soundness (if we can prove the Hoare triple, indeed it holds) but a witness counter-example might not be feasible. The methods and systems described above may be applied to analyse C/C++ source code and in particular, large code bases, such as code bases of 10 to 50 Million lines of code. Examples include Chromium, Firefox and Android. Example type of defects that may be detected are array-out-of-bound, NULL pointer dereference and division by zero. An particularly interesting application is to programs with integers.

In one example, the following modules are implemented in Scala in approximately 500 lines of code:
Parser, CFG
Interpolant Automata generator
Summaries and Hoare_2/Status In a further example the SMT-solver used is SMTInterpol (Freiburg Univ., Automizer) [3]. Further, it is noted that processor 102 may store and re-use interpolant automata, may perform multi-file/multi-pass analysis and determine lazily stronger summaries.

In one example, processor 102 generates a graphical indication of the error state in the source code. Processor 102 may generate the graphical indication by highlighting the line 314 in FIG. 3 of the source code or may generate a display or error message that alerts the programmer that the particular error state has been reached. This indication allows the programmer to review a particular section of the source code and enhance the source code such that the error state cannot be reached anymore, that is, the programmer can fix the bug that was detected by method 200.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "getting", "finding", "establishing", "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

REFERENCES

[1]. Heizmann, M., Hoenicke, J., Podelski, A.: Refinement of trace abstraction. In Palsberg, J., Su, Z., eds.: SAS. Volume 5673 of Lecture Notes in Computer Science, Springer (2009) 69-85

[2]. Heizmann, M., Hoenicke, J., Podelski, A.: Software model checking for people who love automata. In Sharygina, N., Veith, H., eds.: CAV. Volume 8044 of Lecture Notes in Computer Science, Springer (2013) 36-52

[3.]. Christ, J., Hoenicke, J., Nutz, A.: SMTInterpol: An Interpolating SMT Solver. In Donaldson, A. F., Parker, D., eds.: SPIN. Volume 7385 of Lecture Notes in Computer Science, Springer (2012) 248-254

The invention claimed is:

1. A tangible, non-transitory computer readable storage medium having data stored therein representing software executable by a processor, which when implemented cause the processor to perform a method for analyzing a computer program based on source code, the source code comprising a call to a function associated with a function implementation, the method comprising:

receiving from a data store a summary that over-approximates the function;

ascertaining, via a processor, based on the summary that over approximates the function, an assignment of an input variable and an output variable of the call to the function such that the assignment allows the program to reach a predefined state;

determining, via the processor, based on the implementation of the function whether the assignment of the input variable results in the assignment of the output variable;

executing a trace refinement software processor module configured to, upon determining that the assignment of the input variable does not result in the assignment of the output variable, determining a narrowed summary for the function such that the narrowed summary over-approximates a strongest postcondition of the function and excludes the assignment of the input variable and the output variable; and storing the narrowed summary associated with the function on a datastore enabling analysis of the computer program without in-lining function calls.

2. The method of claim 1, wherein determining the narrowed summary comprises:

generalizing the assignment of the input and output variables based on the assignment of the input and output variables; and determining the narrowed summary such that the narrowed summary excludes the generalized assignment of the input and output variables.

3. The method of claim 2, wherein generalizing the assignment of the input and output variables comprises using a rejecting automaton to generalize the assignment of input and output variables.

4. The method of claim 1, further comprising determining a sequence of instructions such that the sequence of instructions allows the program to reach the predefined state, wherein determining the assignment of input and output variables comprises determining the assignment of input and output variables such that the assignment the sequence of instructions.

5. The method of claim 1, wherein determining whether the assignment of the input variables results in the assignment of the output variables comprises performing a second iteration of the method, wherein the source code in the second iteration is the source code of the called function.

6. The method of claim 1, further comprising upon determining that the assignment of the input variables does result in the assignment of the output variables, storing an indication on the datastore that there is an error in the program.

7. The method of claim 1, wherein the source code comprises a first call to the function and a second call to the same function, wherein determining the assignment of input and output variables of the second call to the function is based on the narrowed summary determined in relation to the first call to the function.

8. The method of claim 1, further comprising receiving the summary from the datastore.

9. The method of claim 1, wherein the source code comprises multiple calls to multiple functions and the method comprises repeating the method for each of the multiple calls.

10. The method of claim 9, wherein repeating the method comprises performing the method for two or more of the multiple functions concurrently.

11. The method of claim 10, wherein performing the method concurrently comprises performing the method concurrently on two or more processor cores.

12. The method of claim 1, wherein the source code comprises multiple files and the method comprises performing the method once for each of the multiple files and then repeating the method.

13. The method of claim 1, further comprising repeating the method for multiple repetitions using the narrowed summary of a first repetition as the summary for a subsequent repetition to iteratively further narrow the summary.

14. The method of claim 13, further comprising:
determining whether a termination criterion is met; and
upon determining that the termination criterion is met, terminating the repeating of the method and storing on the datastore an indication that no error has been found.

15. The method of claim 1, wherein the predefined state is an error state.

16. The method of claim 1, wherein the function implementation is a behavioural specification.

17. The method of claim 1, further comprising generating a graphical indication of the predefined state in the source code.

18. A computer system for analyzing a program based on source code, the computer system comprising:

a datastore to store the source code comprising a call to a function associated with a function implementation;

a processor to determine, based on a summary that over-approximates the function, an assignment of an input variable and an output variable of the call to the function such that the assignment allows the program to reach a predefined state, to determine, based on the implementation of the function whether the assignment of the input variable results in the assignment of the output variable, upon determining that the assignment of the input variable does not result in the assignment of the output variable; and a trace refinement software processor module configured to determine a narrowed summary for the function such that the narrowed summary over-approximates a strongest postcondition of the function and excludes the assignment of the input variable and the output variable, and to store the narrowed summary associated with the function on the datastore to enable analysis of the computer program without in-lining function calls.

19. The computer system of claim 18, wherein the source code comprises multiple calls to multiple functions and the method comprises repeating the method for each of the multiple calls concurrently.

* * * * *